US008111614B2

(12) United States Patent
Feuer et al.

(10) Patent No.: US 8,111,614 B2
(45) Date of Patent: Feb. 7, 2012

(54) REMOTE REDUNDANT VOICE SERVER SYSTEM

(75) Inventors: David E. Feuer, Bergenfield, NJ (US);
David Lando, West Orange, NJ (US);
Joe Morris, Monsey, NY (US)

(73) Assignee: Net2Phone, Inc., Newark, NJ (US)

( * ) Notice: Subject to any disclaimer, the term of this patent is extended or adjusted under 35 U.S.C. 154(b) by 0 days.

(21) Appl. No.: 11/987,293

(22) Filed: Nov. 29, 2007

(65) Prior Publication Data

US 2008/0267062 A1 Oct. 30, 2008

Related U.S. Application Data

(60) Provisional application No. 60/861,446, filed on Nov. 29, 2006.

(51) Int. Cl.
*H04L 12/66* (2006.01)
(52) U.S. Cl. ......... 370/220; 370/218; 370/221; 370/386
(58) Field of Classification Search ................. 370/218, 370/220, 221, 386
See application file for complete search history.

(56) References Cited

U.S. PATENT DOCUMENTS

| 6,560,329 | B1 | 5/2003 | Draginich et al. | |
|---|---|---|---|---|
| 6,697,858 | B1 * | 2/2004 | Ezerzer et al. | 709/224 |
| 7,275,099 | B2 * | 9/2007 | Suzuki | 709/223 |
| 7,613,170 | B1 * | 11/2009 | Grabelsky et al. | 370/352 |
| 2005/0005195 | A1 * | 1/2005 | Suzuki | 714/13 |

(Continued)

FOREIGN PATENT DOCUMENTS

WO WO/2006/092368 * 9/2006

OTHER PUBLICATIONS

International Search Report and Written Opinion mailed Jun. 24, 2008 in corresponding PCT application No. PCT/US07/24534.

*Primary Examiner* — Daniel J. Ryman
*Assistant Examiner* — Jay P Patel
(74) *Attorney, Agent, or Firm* — Davidson Berquist Jackson & Gowdey, LLP

(57) ABSTRACT

During normal operation, a user terminal supported by an IP-PBX server establishes a call by resolving the name of the IP-PBX server using a DNS server. When the DNS server provides the address of the IP-PBX server, the IP-PBX server can be contacted. However, if the SIP controller learns that the IP-PBX is no longer operating, the information stored by the service provider environment may be used to build or configure an IP-Centrex server at a remote site which takes over for the failing IP-PBX server. The newly configured IP-Centrex server then registers itself with the SIP controller and either the SIP controller or the IP-Centrex server then informs the DNS server of the IP address of the IP-Centrex and tells the DNS server that the IP-Centrex server will respond to messages for the failed IP-PBX server. The newly configured IP-Centrex server then handles the messages and control flow previously handled by the IP-PBX server. When the IP-PBX server is repaired or replaced, the IP-PBX server informs the SIP controller that it is back online and either the SIP controller or the IP-PBX server then informs the DNS server that the IP-PBX server will again be handling the call requests for the IP-PBX server.

9 Claims, 6 Drawing Sheets

U.S. PATENT DOCUMENTS

| | | | |
|---|---|---|---|
| 2005/0083922 A1* | 4/2005 | Takai et al. | 370/386 |
| 2005/0122958 A1* | 6/2005 | Shim et al. | 370/352 |
| 2005/0180317 A1 | 8/2005 | Shimada | |
| 2006/0209794 A1* | 9/2006 | Bae et al. | 370/352 |
| 2006/0256789 A1* | 11/2006 | Otto et al. | 370/389 |
| 2007/0019545 A1* | 1/2007 | Alt et al. | 370/230 |
| 2007/0019623 A1* | 1/2007 | Alt et al. | 370/352 |
| 2007/0022289 A1* | 1/2007 | Alt et al. | 713/168 |
| 2007/0036143 A1* | 2/2007 | Alt et al. | 370/352 |
| 2008/0247381 A1* | 10/2008 | Bohm et al. | 370/352 |

\* cited by examiner

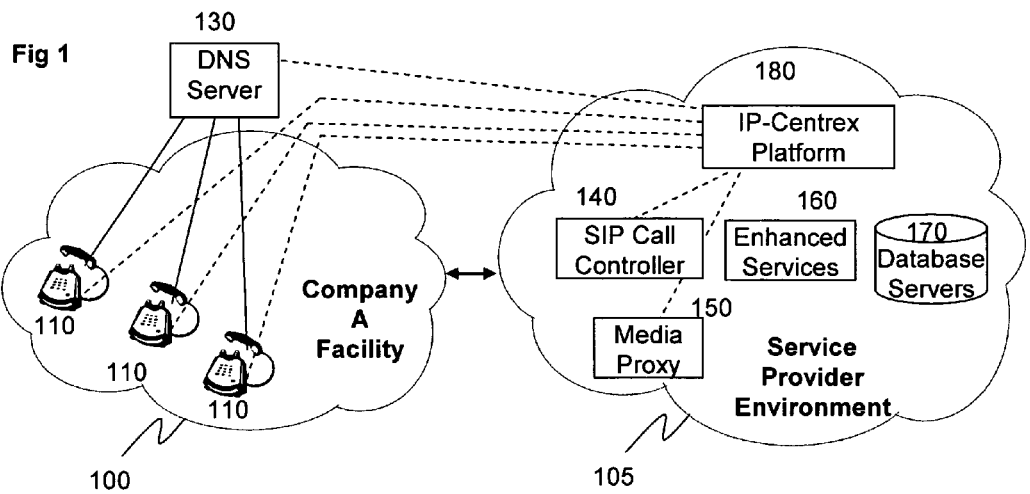
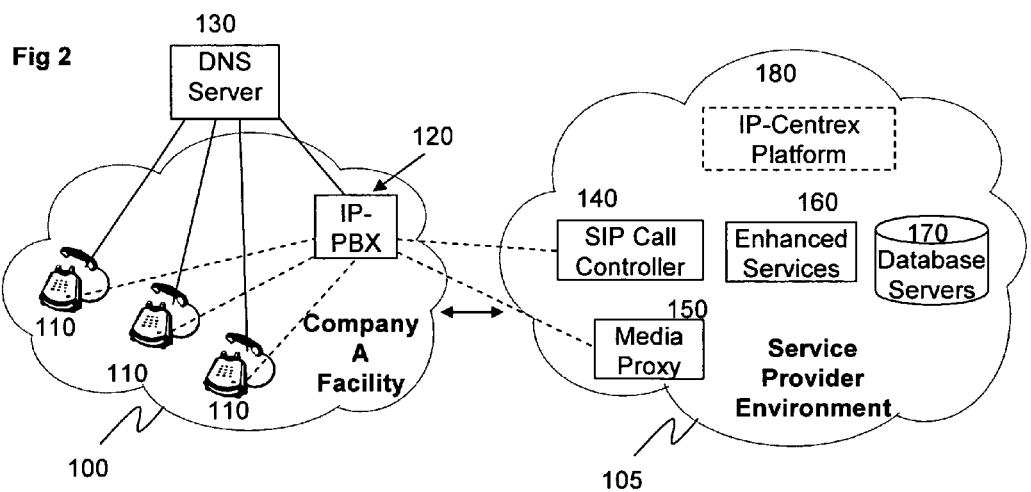

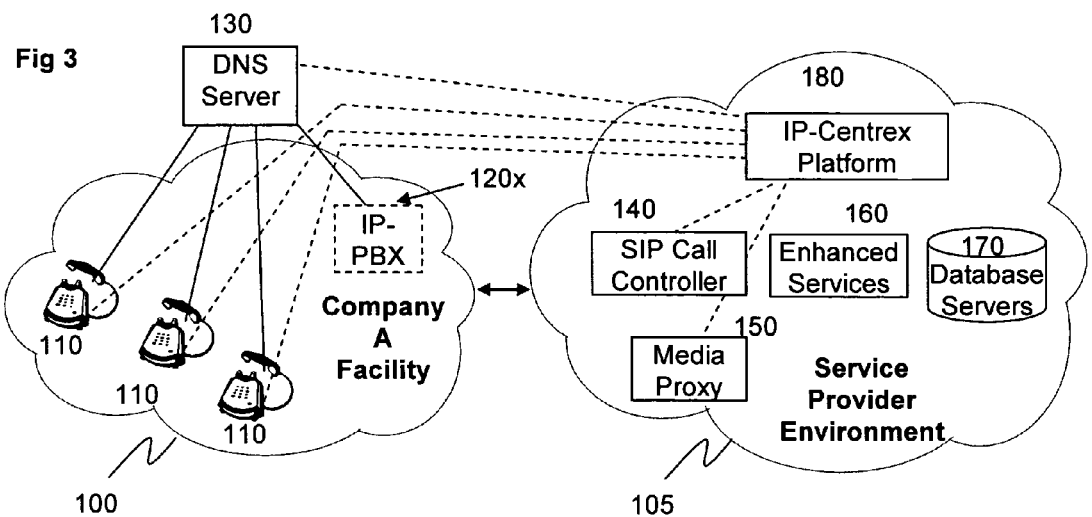

REMOTE REDUNDANT VOICE SERVER SYSTEM

FIELD OF INVENTION

The present invention is directed a method and system of providing back-up voice services in a voice-over-IP environment, and in one embodiment, to a method and system for linking DNS names with SIP registration messages in order to provide back-up voice services in a voice-over-IP environment.

DISCUSSION OF THE BACKGROUND

When providing voice-over-IP services using an IP-Centrex-style PBX, one possible option is to utilize a remote IP-Centrex server and to have no such server on the local premises of the customer, as is shown in FIG. 1. However, all telephony availability is dependent on Internet connectivity to that remote server. This means that even intra-company telephony services, such as voicemail and intra-company-to-intra-company calling, can be lost when Internet connectivity is lost. This Internet point of failure is not overcome by using redundant remote servers for improved sever availability because they too need to be reached using the Internet.

As an alternative to a solution that uses only remote servers, it is possible to use a set of redundant servers on the customer's premises such that if there is a problem with one server, another server can be used locally as a back-up. However, this solution increases the cost of operation under normal operating conditions (i.e., when the main server is not experiencing any problems).

Accordingly, it would be beneficial to be able to have intra-company telephony services, even in the presence of a failure of an Internet connection, without having the associated cost of a local, redundant back-up server for use during failures of the main server.

BRIEF DESCRIPTION OF THE DRAWINGS

The following description, given with respect to the attached drawings, may be better understood with reference to the non-limiting examples of the drawings, wherein:

FIG. 1 is a high-level diagram of a remote-server based telephony configuration which requires an Internet connection;

FIG. 2 is a high-level diagram of a local-server based telephony configuration can provide intra-company telephony services even when an Internet connection is not available;

FIG. 3 is a high-level diagram of a local-server based telephony configuration which has switched over to a remote-server based telephony configuration in light of a failure of the local server;

DISCUSSION OF THE PREFERRED EMBODIMENTS

Figure 4:
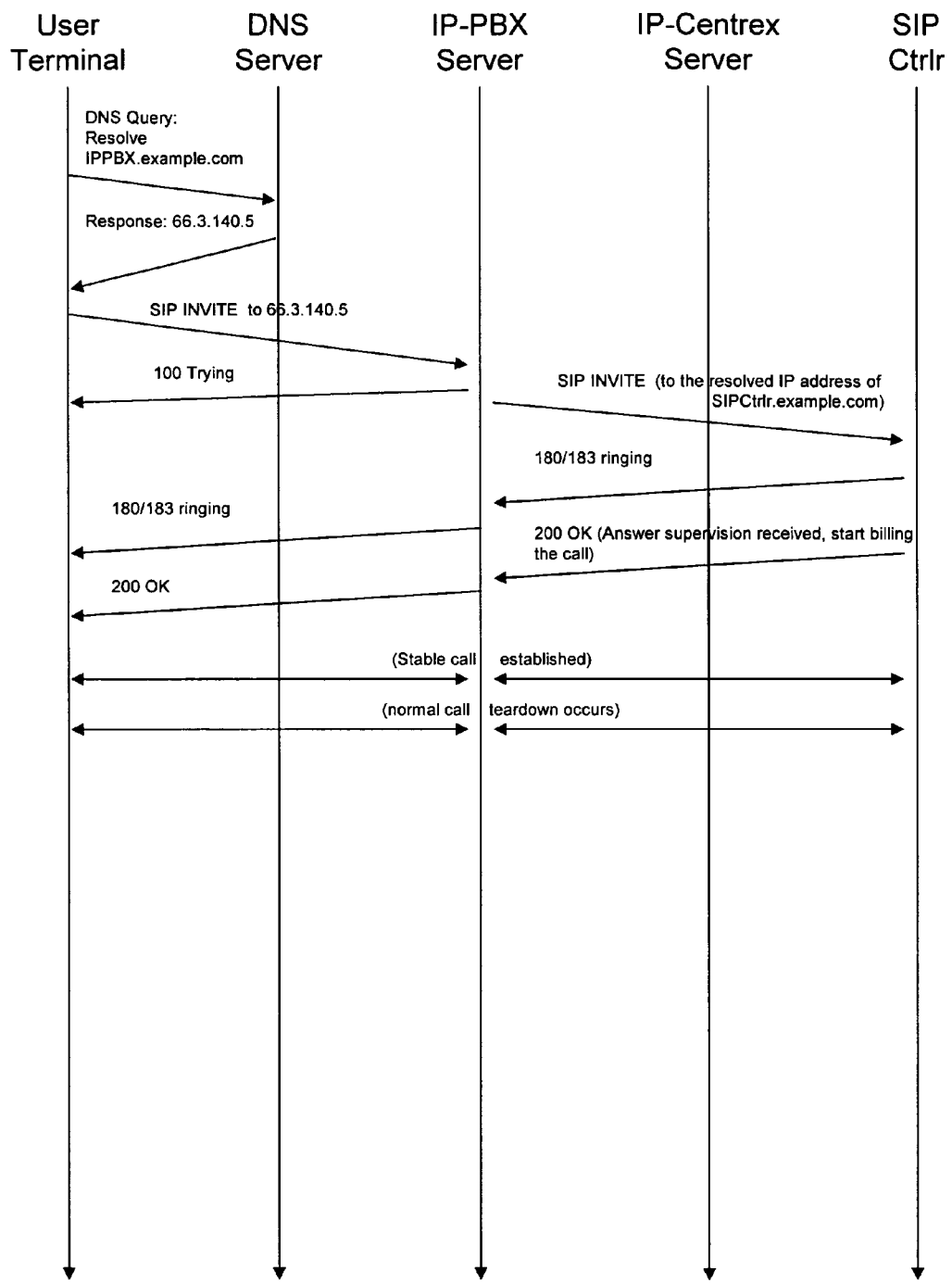
FIG. 4 is a message diagram showing exemplary messages which allow a user terminal to connect an out-bound calling using an IP-PBX at a customer-side.

Turning to FIG. 2, FIG. 2 depicts the architecture of the subject disclosure during normal operations. Company A facility depicts several exemplary user terminals 110, which comprise various types such as VoIP phones, POTS phones connected through IP gateways, IP-enabled fax machines, PCs and similar. User terminals 110 are usually connected to IP-PBX 120, through a LAN (within the network cloud 100). The IP addresses of all devices are available to IP-PBX 120 through DNS Server 130. IP-PBX 120 is linked the service provider's environment 105 through an IP network (such as a WAN or the Internet).

SIP Call Controller 140 represents all necessary SIP (Session Initiation Protocol) platforms, and in particular a SIP back-to-back user agent (B2BUA) as defined by RFC 3261. Since this agent permits complete control over an end-to-end SIP session, the use of the B2BUA permits the service provider to offer enhanced communication services beyond plain interactive voice, when supported by the enhanced-services platform 160. The availability of enhanced services is a significant reason for company A's choice of a service-provider environment.

Media proxy 150 appears within service provider environment 105 as a means to enable NAT (Network Address Translation) traversal as is known in the art. All components shown within the service provider environment 105 in FIG. 2 are interconnected via a LAN.

Connections necessitated for establishing IP addresses are shown as solid lines, whereas all other media and/or signaling links are shown as dashed lines. The IP-Centrex platform 180 acts an IP-Centrex in case of IP-PBX failure, and for the purpose of this illustration, also represents the administrative and operational controller for the subject system and service. For example, the IP-Centrex platform 180 contains the functions of registrar and presence sensing of IP-PBX 120 and of user terminals 110, so that service failover can occur when IP-PBX 120 "disappears".

Database 170 represents all storage functions shared across platforms in service provider environment 105. For example, database 170 may store corporate customer preferences, service details, and session/billing records.

Incoming and outgoing sessions are generally handled through IP-PBX 120, which is connected, to at least one IP network, not shown, for media and signaling transport. In some embodiments, it is not necessary for all session transport to occur via service-provider environment 105, though some enhanced services may require it. Additionally, IP-PBX 120 may be connected to PSTN network(s), not shown, to enable sessions (calling or called) where such connectivity presents economic or quality advantage as guided by Company A's routing tables in IP-PBX 120.

FIG. 3 depicts the failover case, an example of which is triggered by the failure of IP-PBX (labeled 120x to indicate its failure) or its connectivity. The condition is detected by the registrar & presence-sensing functions of IP-Centrex platform 180, and the IP-Centrex takes over the functions of the IP-PBX as described below. In a preferred embodiment, the registrar and presence-detection functions are embedded in a server that is physically distinct from IP-Centrex 180, and may not be collocated with it. The IP addresses of user terminals are provided by DNS server 130 as needed; signaling information flows to the SIP call controller 140 and media proxy 150 through the IP-Centrex platform 180.

During normal operations (FIG. 2) the registrar & presence server associates dynamic DNS addresses with the IP addresses of IP-PBX installations, each of which supports a facility exemplified by company A facility 100. When an IP-PBX fails, the registrar and presence sensing server triggers a process that makes the failed IP-PBX's configuration data available to the IP-Centrex platform. Once the IP-Centrex platform is built using said configuration data, the remote server registers, and is associated with the dynamic DNS data that originally pointed to the failed IP-PBX. In order to minimize transition time, the DNS server should have a short caching time (AKA "time to live") for DNS address translation data associated with IP-PBXs.

As shown in FIG. 4, during normal operation, a user terminal supported by an IP-PBX server establishes a call by resolving the name of the IP-PBX server (e.g., IPPBX.example.com) using a DNS server. When the DNS server provides the address of the IP-PBX server, the IP-PBX server can be contacted (e.g., with a SIP Invite message). The IP-PBX server can then respond to the user terminal with an appropriate response (e.g., TRYING) while it tries to communicate with the SIP controller (which may be resolved using fixed routing or via a DNS query). The SIP controller may return a message (e.g., RINGING or call established or busy) to the IP-PBX server which then forwards at least a portion of that response to the user terminal. At the completion of the call, the SIP controller handles call teardown.

Figure 5:
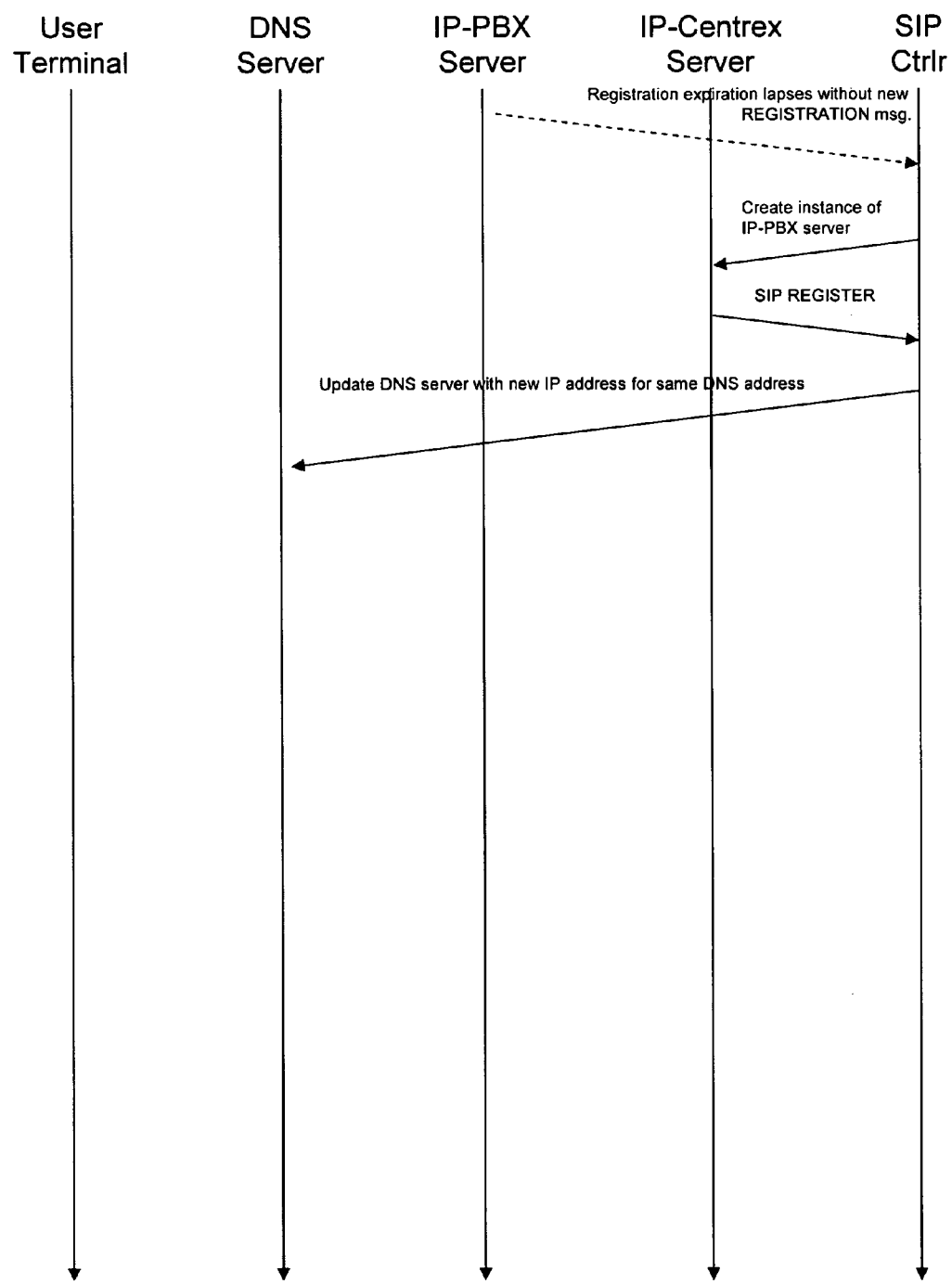
FIG. 5 is a message diagram showing exemplary messages which allow an IP-Centrex at a remote site to take over for a failing or failed IP-PBX at a customer-side.

However, as shown in FIG. 5, it is possible that the SIP controller learns that the IP-PBX is no longer operating (e.g., because a periodic message has not been received or because an error report has been received, such as via a web submission). In the event of a non-responsive IP-PBX, the information stored by the service provider environment may be used to build or configure an IP-Centrex server which takes over for the failing IP-PBX server. The stored information may include any necessary information to handle some or all of the services normally handled by the IP-PBX (e.g., directory and or extension information, call routing rules and/or restrictions, etc.). The newly configured. IP-Centrex server then registers itself with the SIP controller and either the SIP controller or the IP-Centrex server then informs the DNS server of the IP address of the IP-Centrex and tells the DNS server that the IP-Centrex server will respond to messages for the failed IP-PBX server.

Figure 6:
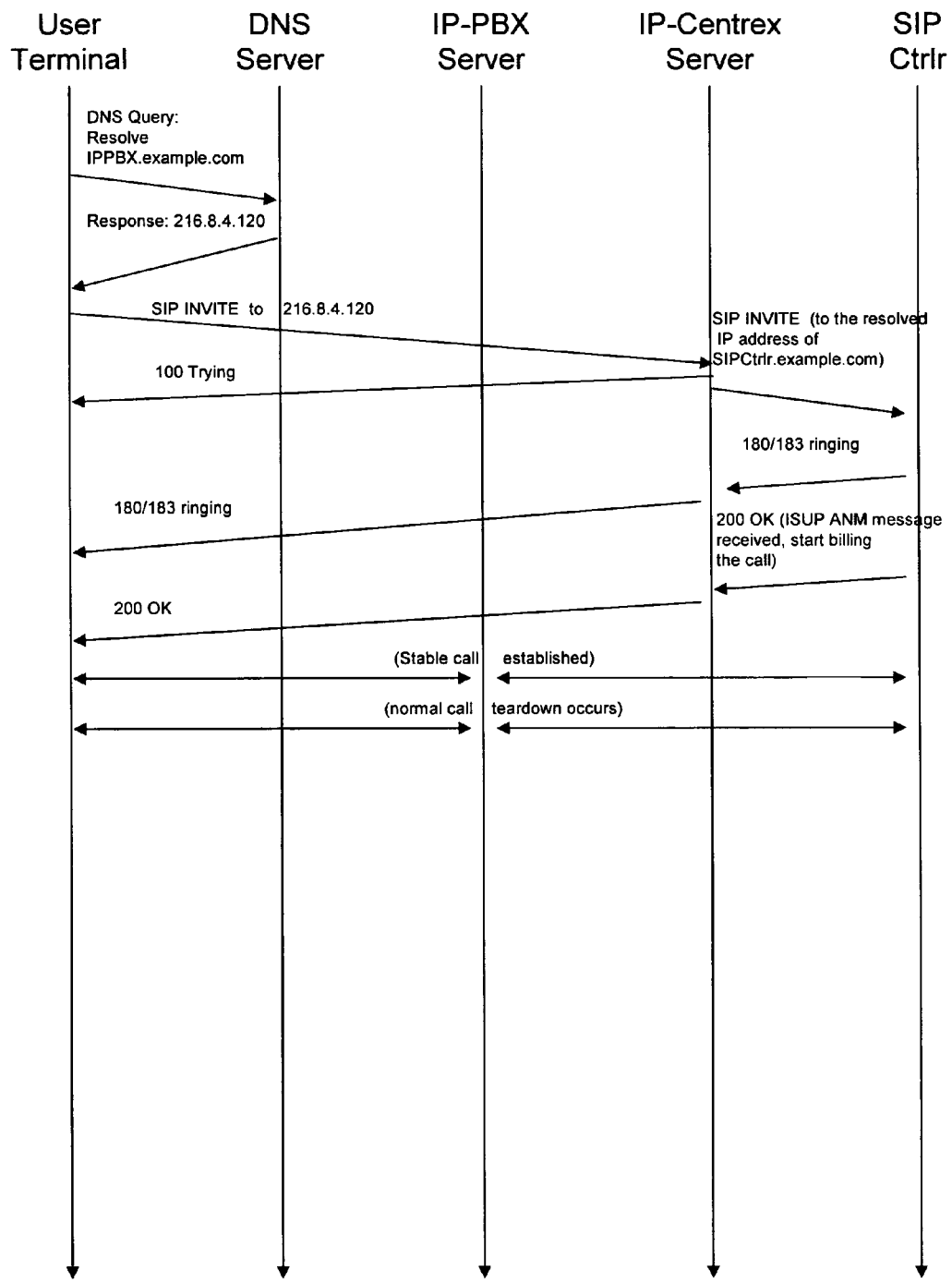
FIG. 6 is a message diagram showing exemplary messages which allow a user terminal to connect an out-bound calling using the IP-Centrex at a remote site while an IP-PBX at a customer-side is unresponsive.

As shown in FIG. 6, any DNS query received from a user terminal for IPPBX.example.com will instead cause the user terminal to receive the IP address of the IP-Centrex server. The subsequent SIP Invite message described above would then go to the IP-Centrex server instead of the IP-PBX server, and call processing would continue as it did with respect to FIG. 4, except that the IP-Centrex server now handles the messages and control flow previously handled by the IP-PBX server.

Figure 7:
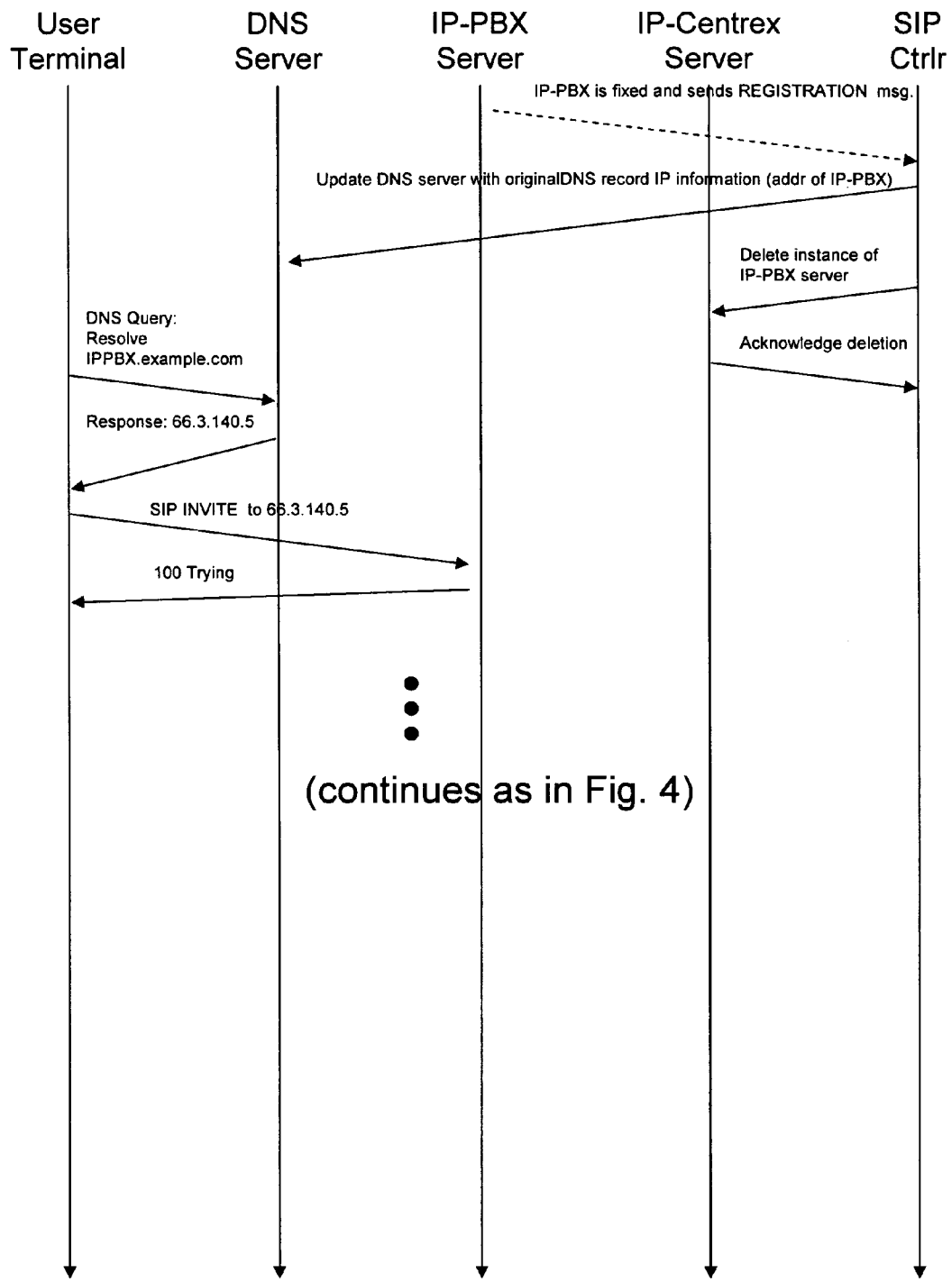
FIG. 7 is a message diagram showing exemplary messages which allow a previously failing or failed IP-PBX at a customer-side to take over from an IP-Centrex at a remote site and resume routing calls.

As shown in FIG. 7, when the IP-PBX server is repaired or replaced, the IP-PBX server informs the SIP controller that it is back online and either the SIP controller or the IP-PBX server then informs the DNS server that the IP-PBX server will again be handling the call requests for the name IPPBX.example.com. The IP-Centrex server can then be "unconfigured" such that it is ready to be configured for another failing IP-PBX server in the future.

In one possible embodiment of the environment described herein, the IP-PBX server 120 of company A periodically (e.g., daily) sends to the service provider environment enough information that the service provider environment can provide essential features (e.g., dialing and incoming call routing) using the new IP-Centrex platform without having to request additional information from company A at the time of the failure. Additionally, non-essential information (e.g., the current status of each voice terminal's voicemail) may also be backed up in the service provider environment. Alternatively, the service provider environment may simply be given access to a voicemail repository at company A such that the IP-Centrex server can read from that voicemail repository as necessary, thereby reducing backup traffic.

This solution is more cost effective and less complex than alternative configurations with similar features. The combination of on-premises and hosted solution provides geographic redundancy for survivability, and enables enhanced services where desired. The solution uses SIP state information to drive dynamic DNS for presence information. The SIP state information, such as the IP-PBX's IP address information gained from the SIP REGISTER message, is already transmitted and stored on the SIP registrar. Once stored in the SIP registrar, the information can be used to drive peripheral services, such as the restore service to support auto-failover.

Similar functionality can be accomplished by:

(i) using one or more high-availability clusters of redundant IP-Centrex platforms; however, this requires redundant communications to company A's facility to guard against network failure.

(ii) Using redundant IP-PBXs in company A's facility; this is a viable solution that is complex to build and maintain.

While certain configurations of structures have been illustrated for the purposes of presenting the basic structures of the present invention, one of ordinary skill in the art will appreciate that other variations are possible which would still fall within the scope of the appended claims.

The invention claimed is:

1. A method of providing back-up voice services, comprising:
   periodically sending from an IP-PBX server to an IP-Centrex server remote from the IP-PBX server sufficient information to provide at least one of dialing and incoming call routing by the IP-Centrex server should the IP-PBX server become unresponsive without having to request additional information from any server associated with a company hosting the IP-PBX server after the IP-PBX server becomes unresponsive;
   periodically sending to the IP-Centrex server status information about plural user voice terminals serviced by the IP-PBX server for use by the IP-Centrex server after the IP-PBX server becomes unresponsive;
   detecting that the IP-PBX server serving the plural user voice terminals has become unresponsive;
   configuring the IP-Centrex server to handle voice calls for the unresponsive IP-PBX server without having to request additional information from any server associated with the company hosting the IP-PBX server after the IP-PBX server becomes unresponsive;
   configuring a DNS server to provide to the plural user voice terminals, in response to a request to resolve a name of the unresponsive IP-PBX server, a first IP address of the IP-Centrex server remote from the unresponsive IP-PBX server instead of a second IP address of the unresponsive IP-PBX server;
   handling calls from the plural user voice terminals at the IP-Centrex server at the first IP address;
   detecting that the unresponsive IP-PBX server has come back online;

configuring the DNS server to provide to the plural user voice terminals, in response to a request to resolve the name of the IP-PBX server, the second IP address of the IP-PBX server after detected that the previously unresponsive IP-PBX server has come back online; and handling calls from the plural user voice terminals at the IP-PBX server at the second IP address.

2. The method as claimed in claim 1, wherein detecting that an IP-PBX server serving plural user voice terminals has become unresponsive comprises detecting that a registration time period expired without a SIP controller receiving a registration message from the IP-PBX.

3. The method as claimed in claim 1, wherein detecting that an IP-PBX server serving plural user voice terminals has become unresponsive comprises receiving a message at a SIP controller that the IP-PBX server is non-responsive.

4. The method as claimed in claim 1, further comprising receiving information about the IP-PBX server needed to configure the IP-Centrex server prior to the IP-PBX server becoming unresponsive.

5. The method as claimed in claim 1, wherein the status information comprises a current status of a voicemail of the plural user voice terminals serviced by the IP-PBX server.

6. A method of providing back-up voice services, comprising:

periodically sending from an IP-PBX server to an IP-Centrex server remote from the IP-PBX server sufficient information to provide at least one of dialing and incoming call routing by the IP-Centrex server should the IP-PBX server become unresponsive without having to request additional information from any server associated with a company hosting the IP-PBX server after the IP-PBX server becomes unresponsive;

detecting that the IP-PBX server serving plural user voice terminals has become unresponsive;

configuring the IP-Centrex server to handle voice calls for the unresponsive IP-PBX server without having to request additional information from any server associated with the company hosting the IP-PBX server after the IP-PBX server becomes unresponsive;

configuring a DNS server to provide to the plural user voice terminals, in response to a request to resolve a name of the unresponsive IP-PBX server, a first IP address of the IP-Centrex server remote from the unresponsive IP-PBX server instead of a second IP address of the unresponsive IP-PBX server;

handling calls from the plural user voice terminals at the IP-Centrex server at the first IP address;

detecting that the unresponsive IP-PBX server has come back online;

configuring the DNS server to provide to the plural user voice terminals, in response to a request to resolve the name of the IP-PBX server, the second IP address of the IP-PBX server after detected that the previously unresponsive IP-PBX server has come back online; and handling calls from the plural user voice terminals at the IP-PBX server at the second IP address, wherein a voicemail repository of the IP-PBX server is separate from the IP-PBX server, the method further comprising providing access by the IP Centrex server to the voicemail repository after the IP-PBX server has become non-responsive.

7. The method as claimed in claim 6, wherein detecting that an IP-PBX server serving plural user voice terminals has become unresponsive comprises detecting that a registration time period expired without a SIP controller receiving a registration message from the IP-PBX.

8. The method as claimed in claim 6, wherein detecting that an IP-PBX server serving plural user voice terminals has become unresponsive comprises receiving a message at a SIP controller that the IP-PBX server is non-responsive.

9. The method as claimed in claim 6, further comprising receiving information about the IP-PBX server needed to configure the IP-Centrex server prior to the IP-PBX server becoming unresponsive.

* * * * *